(12) United States Patent
Uyama

(10) Patent No.: US 6,293,880 B1
(45) Date of Patent: Sep. 25, 2001

(54) VIBRO-ISOLATING SUPPORTING STRUCTURE FOR VERTICAL CRANKSHAFT INTERNAL COMBUSTION ENGINE

(75) Inventor: Toshiyuki Uyama, Osaka (JP)

(73) Assignee: Yanmar Diesel Engine Co., Ltd. (JP)

( * ) Notice: Subject to any disclaimer, the term of this patent is extended or adjusted under 35 U.S.C. 154(b) by 0 days.

(21) Appl. No.: 09/297,807
(22) PCT Filed: Nov. 10, 1997
(86) PCT No.: PCT/JP97/04090
§ 371 Date: May 5, 1999
§ 102(e) Date: May 5, 1999
(87) PCT Pub. No.: WO98/21062
PCT Pub. Date: May 22, 1998

(30) Foreign Application Priority Data

Nov. 11, 1996 (JP) ................................ 8-299120
Nov. 11, 1996 (JP) ................................ 8-299121
Nov. 11, 1996 (JP) ................................ 8-299122

(51) Int. Cl.$^7$ .................. F16H 59/00; F16M 1/00
(52) U.S. Cl. .................. 474/79; 248/637; 474/101
(58) Field of Search .................. 474/79; 180/291, 180/300, 11, 53, 312, 228, 292; 248/638, 636, 568, 637, 562; 267/140.14, 140.15, 140.13, 140.16, 141.1–141.7, 219

(56) References Cited

U.S. PATENT DOCUMENTS 3,429,533 * 2/1969 Harkness ........................... 248/637
3,841,425 * 10/1974 Harkness ........................... 180/53 R
3,951,223 * 4/1976 Kamlukin ........................... 180/11
5,718,417 * 2/1998 Aoki ................................ 267/140.14

FOREIGN PATENT DOCUMENTS 61-125824    8/1986    (JP) .
61-135720    8/1986    (JP) .
   238752 *  9/1989    (JP) .
   641624 *  9/1989    (JP) .
6-288436    10/1994    (JP) .

\* cited by examiner

Primary Examiner—David A. Bucci
Assistant Examiner—Marcus Charles
(74) Attorney, Agent, or Firm—Sterne, Kessler, Goldstein & Fox P.L.L.C.

(57) ABSTRACT

In mounting an engine (vertical crankshaft internal combustion engine) to a frame (support) through a plurality of vibro-isolating members, at least one vibro-isolating member is a vibro-isolating member which is disposed at a position where the tension and rotating torque of a belt wound around an output pulley are substantially perpendicular to each other, or a vibro-isolating member disposed on a flat surface which includes an output shaft therein and is in parallel to the tension. Alternatively, the vibro-isolating members are disposed symmetrically through a flat surface which is in parallel to the output shaft and the tension of the belt and includes therein the center of gravity, or at least one vibro-isolating member is disposed on the flat surface. Also, an axis of the vibro-isolating members is oriented to correspond to a direction of the rotating torque.

7 Claims, 22 Drawing Sheets

VIBRO-ISOLATING SUPPORTING STRUCTURE FOR VERTICAL CRANKSHAFT INTERNAL COMBUSTION ENGINE

FIELD OF THE ART

The present invention relates to a structure for vibro-isolating supporting of a vertical crankshaft type internal combustion engine onto a frame such as to be of a vehicle like a lown tractor.

BACKGROUND ART

When a general conventional horizontal crankshaft type (or vertical cylinder type) internal combustion engine (hereinafter, an engine HE) was loaded on a vehicle like a lown tractor as shown in FIG. 1, which is provided with a disk mower M under the midsection thereof, a universal joint 4 or a bevel gear unit has been interposed between a horizontal output shaft (a power take-out shaft) 1 of engine HE and a vertical driving shaft 3 of disk mower M.

In the case that engine HE is provided with power transmission endless winding means like a belt or chain wound around the output shaft thereof, or when, as shown in FIGS. 2 or 3, a belt (or sprocket) 2 is wound around an output pulley (or sprocket) 1a on output shaft 1 of engine HE, output pulley 1 (that shown in FIG. 3 is apart from a crankshaft CS) is stressed by a tension F1 of belt (chain) 2 and a rotational torque F2 of itself (or crankshaft CS).

Tension F1 is one way directed (in the cases shown in FIGS. 2 and 3, it is horizontal) and stresses permanently. Rotational torque F2, which is generated during the driving of engine HE (particularly, on starting thereof), mainly causes the vibratory force for engine HE.

The vibratory force mainly caused by rotational torque F2 is vertically large. Therefore, there has been employed such a vibro-isolating supporting structure for engine HE as shown in FIG. 2 or 3, that vibro-isolating members A are interposed between the bottom of engine HE and the upper surface of a frame B serving as a support for engine HE.

In the structure, vibro-isolating member A has vertical and horizontal elasticities, wherein the vertical spring constant thereof is preferably small for absorbing the vertical vibratory force caused by rotational torque F2. In this regard, the flexibility of an elastic material like rubber provided in the vibro-isolating member is so enhanced as to absorb the vibration.

Vibro-isolating member A with a horizontally large spring constant, that is, having the elastic member with a small flexibility can resist against horizontal tension F1 as shown in FIGS. 2 and 3, so that the horizontal contortion of output shaft 1 with engine HE pulled by the belt or chain can be reduced, and the belt or chain can be prevented from slipping or waving.

The conventional power transmission system between the horizontal crankshaft type engine and a vertical driving shaft, such as that of the above-mentioned lown tractor, has required a complicated structure comprising such as a universal joint, bevel gears or the like. If the power for the vertical driving shaft is taken out from a vertical output shaft of a vertical crankshaft type internal combustion engine, the power transmission system therefor will be simplified only with power transmission endless winding means like a belt or chain, as shown in FIG. 4 detailed later, wherein belt 2 is interposed between output pulley 1a on output shaft 1 of an engine VE, serving as a vertical crankshaft type internal combustion engine, and a driving pulley 3a on driving shaft 3 of disk mower M, thereby being reduced in its cost and easing its maintenance.

Conventionally, vertical crankshaft type engine VE has been directly supported by a support such as a frame B as shown in FIG. 5 detailed later, so that the problem has arisen that frame B and engine E are vibrated together in a horizontal rotational direction. If frame B was a part of the vehicle body of the lown tractor shown in FIG. 4, for example, the vehicle body would be vibrated according to the vibration of frame B. Therefore, it has been thought that the engine was supported onto the frame through vibro-isolating means so as to make the frame vibration-proof. In this case, considered location of the vibro-isolating means can prevent the belt or chain from forcible stress.

However, onto the vertical crankshaft type engine is applied mainly horizontal vibratory force caused by the rotation of its crankshaft, so that the vibro-isolating supporting structures shown in FIGS. 2 and 3, which are made resistant against vertical vibration, cannot be used as they are. In this regard, while both forces regarding to the vertical crankshaft type engine comprising the vibratory force caused by the rotary torque and the tension caused by the power transmission endless belt (hereinafter, "belt" may be replaced with "chain".) are horizontal, each of the vibro-isolating members shown in FIGS. 2 and 3, if it was made of elastic material having vertical and horizontal flexibilities, has been located so that a small spring constant direction thereof was set vertical to resist against the vibratory force and a large spring constant direction thereof was set horizontal to resist against the tension, whereby such the large spring constant thereof in the horizontal direction disagrees with that required to make the engine vibro-isolated. Especially, at the position where the directions of the both forces coincide with each other, when the spring constant in thereof parallel to the direction of both forces are set small, or when the flexibility of the elastic material of the vibro-isolating member is set large, the rotational torque is absorbed so as to reduce the vibration, however, the distortion of the engine by the tension of the belt becomes large so as to cause the slipping or waving of the belt, thereby reducing the durability thereof. At the same position, when the spring constant thereof directed in the direction of the both forces is set large, or when the above-mentioned flexibility is set small, the distortion of the engine pulled by the belt is reduced so as to increase the durability of the belt, however, the vibratory force cannot be absorbed, whereby the vibration of the engine becomes large. Thus, the vibro-isolating supporting structure for a vertical crankshaft type engine has included the problems about formation and location of the vibro-isolating member.

Also, while the rotational torque is caused by the rotation of the crankshaft or the output shaft, the fact to be considered for locating the vibro-isolating member is that the rotational vibratory force is generated around the center of gravity of the engine whose weight is entirely unequal.

Furthermore, when the small spring constant direction of the vibro-isolating member coincides with the rotational direction of the vibratory force caused by the rotational torque, the problem has arisen that the deflection of the elastic material, when the engine starts, might exceed the limitation thereof because the rotational torque is considerably large on starting of the engine. To solve the problem, the elastic material of the vibro-isolating member is preferably set to increase its spring constant in the same direction (or to reduce its flexibility) when the deflection thereof exceeds a certain value.

DISCLOSURE OF THE INVENTION

To solve the above-mentioned problems, a vibro-isolating supporting structure for a vertical crankshaft type internal combustion engine according to the present invention is as follows:

For a first structure, a vertical crankshaft type internal combustion engine having an output shaft, around which power transmission endless winding means is wound, is supported onto a support through a plurality of vibro-isolating members.

For a second structure, the support is provided with portions for allowing the vibro-isolating members to pass therethrough, thereby reducing the space for the disposal of the vibro-isolating members between the support member and the engine.

For a third structure according to either the first or second structure, the vibro-isolating members are located at the positions where the torque caused by the rotation of the output shaft is directed in perpendicular to the tension caused by the power transmission endless winding means. For a fourth structure according to the third structure, at least one of the vibro-isolating members is disposed between tracks of the power transmission endless winding means or between extensions of the tracks thereof.

For a fifth structure according to either the first or second structure, at least one of the vibro-isolating members is disposed on a flat surface which includes the output shaft therein and is parallel to the tension of the power transmission endless winding means.

For a sixth structure according to one of the third, fourth and fifth structures, a plurality of the power transmission endless winding means are wound around the output shaft. In this case, the direction of the above-mentioned tension caused by the power transmission endless winding means may be replaced with that of the resultant force of tensions of the plurality of means.

For a seventh structure, the vertical crankshaft type internal combustion engine provided with the power transmission endless winding means wound around its output shaft is supported onto the support through the plurality of vibro-isolating members, which are located symmetrically about a flat surface which includes a center of gravity of the engine therein and is parallel to both the tension caused by the power transmission endless winding means and the output shaft.

For an eighth structure, the vertical crankshaft type internal combustion engine provided with the power transmission endless means wound around its output shaft is supported onto the support through the plurality of vibro-isolating members, at least one of which is disposed on a flat surface which includes a center of gravity of the engine therein and is parallel to both the tension caused by the power transmission endless winding means and the output shaft.

For a ninth structure according to either the seventh or eighth structure, a plurality of the power transmission endless winding means are wound around the output shaft. In this case, the above-mentioned tension caused by the power transmission endless winding means is replaced with the resultant force of tensions of the plurality of means.

For the tenth structure, the vertical crankshaft type internal combustion engine provided with the power transmission endless winding means wound around its output shaft is supported onto the support through the plurality of vibro-isolating members, which are located at a position where their small spring constant directions coincide with the direction of vibratory force and the direction of the tension caused by the power transmission endless winding means is different from that of the vibratory force.

For the eleventh structure according to the tenth structure, each of the vibro-isolating members has such a characteristics that its spring constant of one way direction of the two opposite directions coinciding with the vibratory force direction is increased in proportion to the deflection of the same direction, and at least one pair of the vibro-isolating members are disposed so as to face their characteristic one way directions against each other.

BRIEF DESCRIPTION OF THE DRAWINGS

FIG. 28 is the same view showing another embodiment;

FIG. 34 illustrates the direction of resultant force F1c of tensions F1a and F1b when a plurality of belts 2a and 2b are wound around output pulley 1a;

BEST MODE FOR CARRYING OUT OF THE INVENTION

Figure 1:
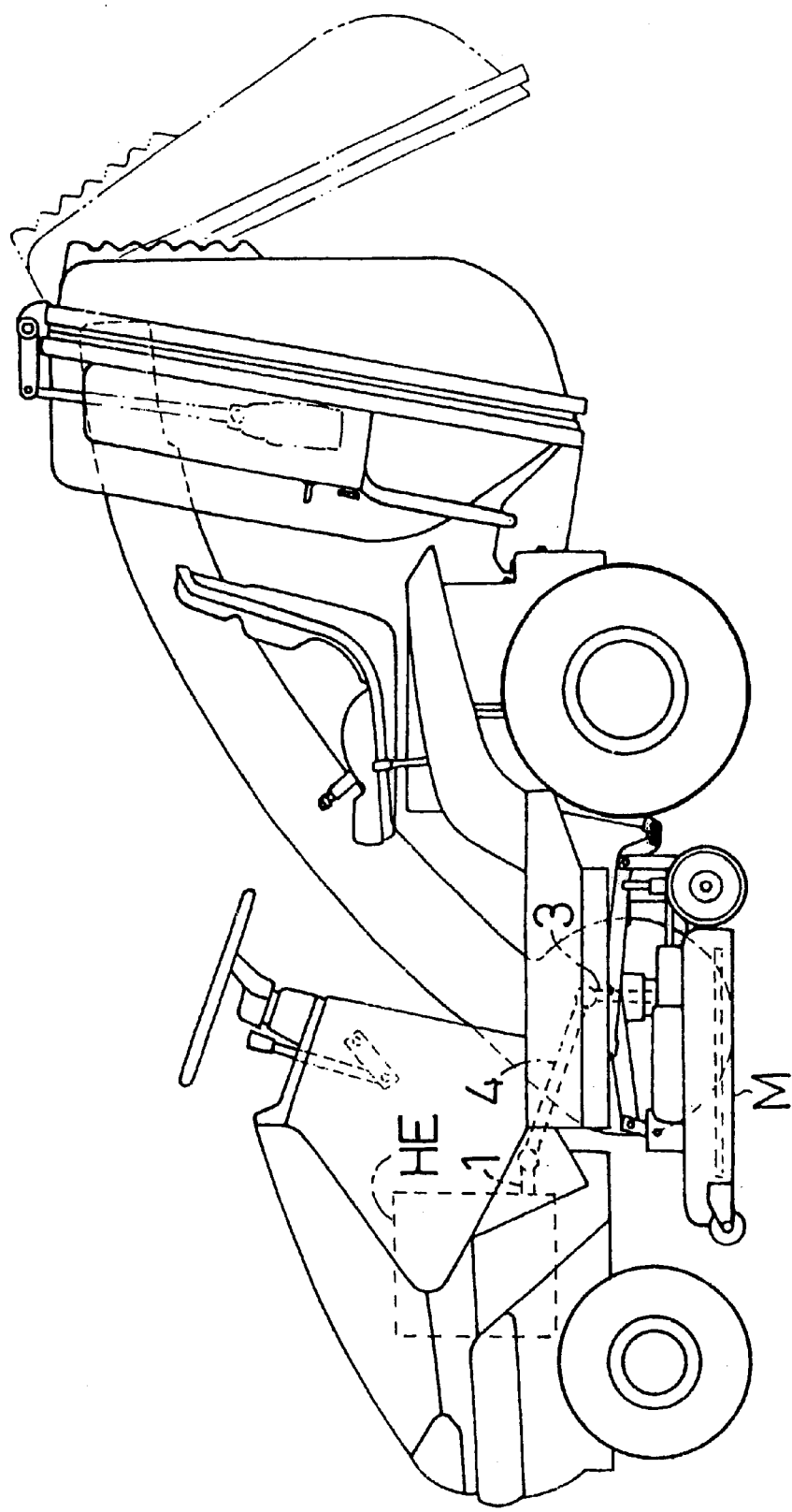
FIG. 1 is a side view of a lown tractor loading a horizontal crankshaft type internal combustion engine thereon.
Figure 2:
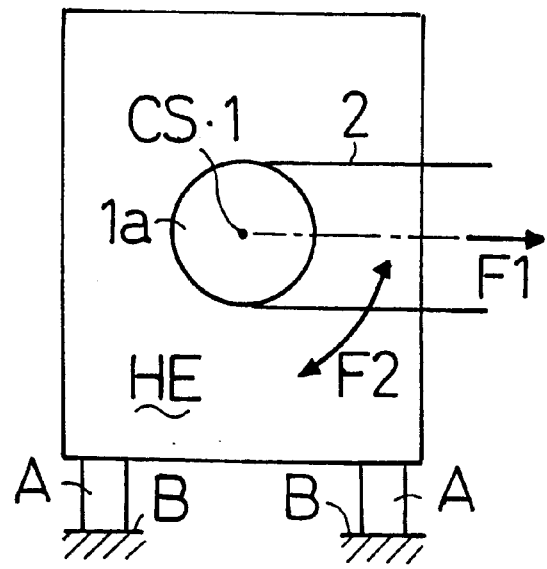
FIG. 2 is a front view of a vibro-isolating supporting structure of a horizontal crankshaft type internal combustion engine provided with an endless winding means (belt) type power transmission system showing the directions of forces generated therefrom, wherein a crankshaft is the same with an output shaft.
Figure 3:
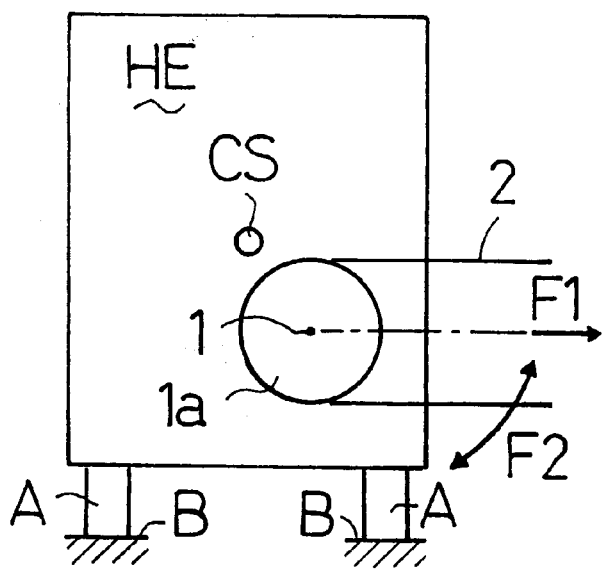
FIG. 3 is a front view of the same, wherein the crankshaft is different from the output shaft.
Figure 4:
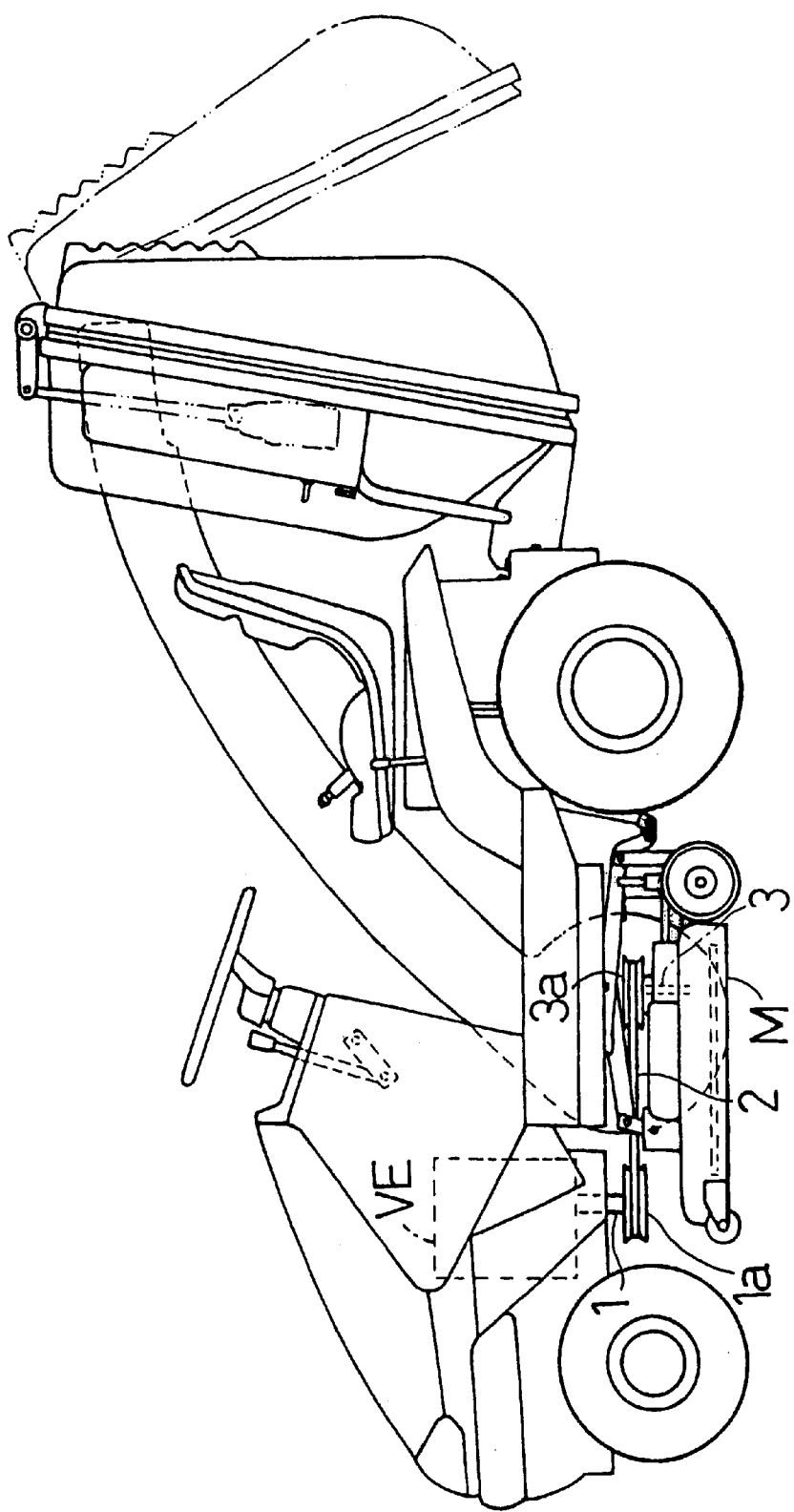
FIG. 4 is a side view of a lown tractor loading a vertical crankshaft type internal combustion engine (engine VE) thereon.

Referring to FIG. 4, a lown tractor is provided for an embodiment of an object supporting a vertical crankshaft type internal combustion engine (hereinafter, engine VE) provided with a transmission belt serving as power transmission endless winding means. The lown tractor is provided under the bottom of its midsection with disk mower M hung thereon. Belt 2 is horizontally interposed between a driving pulley 3a on vertical driving shaft 3 of disk mower M and an output pulley 1a on output shaft 1 projecting downwardly from engine VE in a bonnet of the lown tractor. Such a transmission system is simpler than that between horizontal crankshaft type engine HE and driving shaft 3 shown in FIG. 1. Belt 2 described hereinafter may be replaced with chain 2. In this case, output pulley 1a and driving pulley 3a are replaced with output sprocket 1a and driving sprocket 3a respectively.

Figure 5:
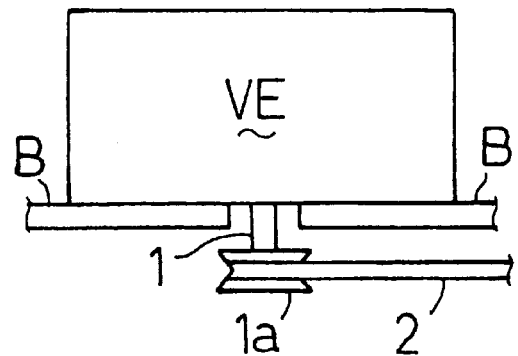
FIG. 5 is a side view of engine VE directly mounted to frame B.

For supporting engine VE onto a vehicle body of the lown tractor, conventionally, engine VE has been directly fixedly attached to frame B as a part of the vehicle body. Downwardly vertical output shaft 1 is stressed by tension F1 caused by belt 2 and rotational torque F2 caused by the rotation of crankshaft CS. Both tension F1 and rotational torque F2 stress horizontally. Hence, in the structure shown in FIG. 5, frame B has been horizontally vibrated greatly, thereby making the resultant vehicle body vibrated greatly horizontally.

Figure 6:
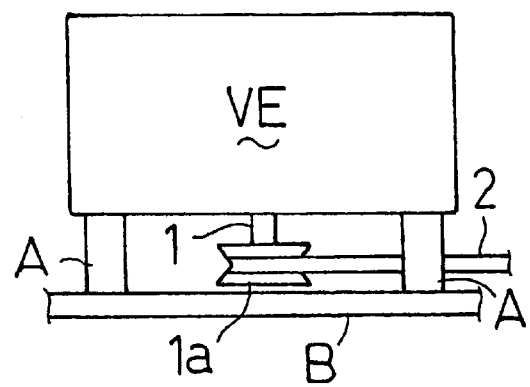
FIG. 6 is a side view of a vibro-isolating supporting of engine VE onto the top of frame B through vibro-isolating members A disposed below engine VE.
Figure 7:
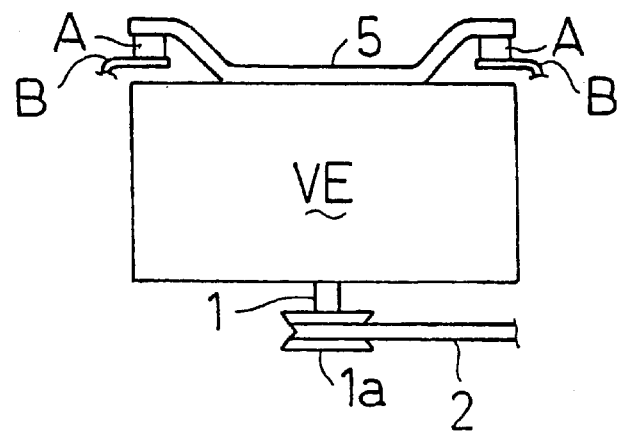
FIG. 7 is a side view of the same onto the top of frame B through vibro-isolating members A disposed above engine VE.
Figure 8:
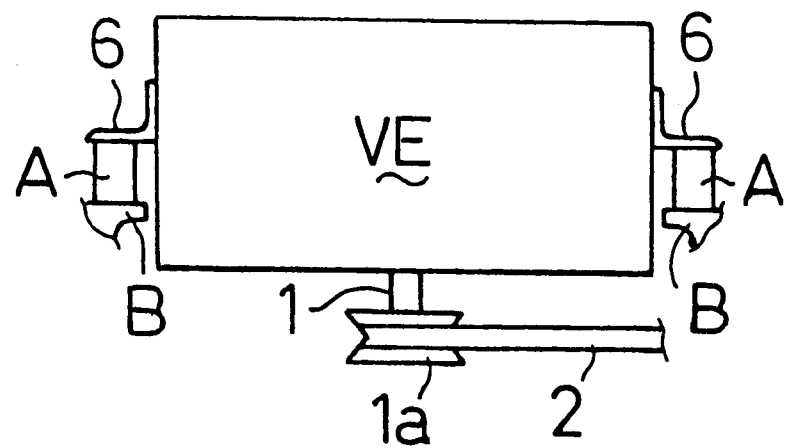
FIG. 8 is a side view of the same onto the top of frame B through vibro-isolating members A disposed beside engine VE.
Figure 9:
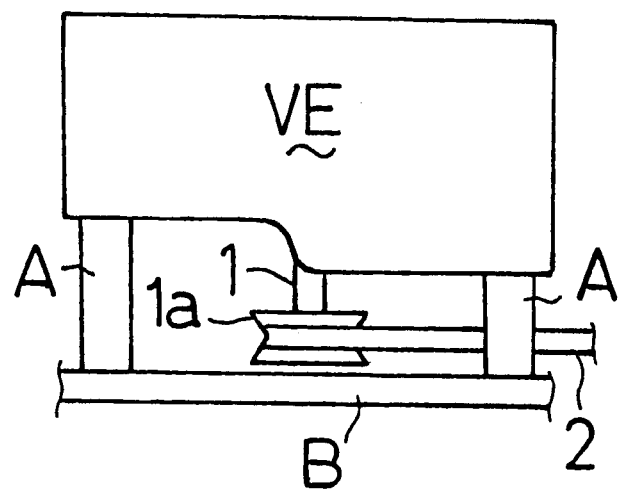
FIG. 9 is a side view of the same onto the top of frame B through vibro-isolating members A disposed below engine VE, wherein the height of the bottom of engine VE is unequal.

Therefore, vertical crankshaft type engine VE should be supported onto frame B so as to be vibro-isolated therefrom. At first, explanation will be given on each of embodiments shown in FIGS. 6 through 13, which illustrates each of top-mounting type structures, wherein engine VE or a bracket fixedly attached to engine VE is mounted on the tops of vibro-isolating members A disposed on the top of frame B. Referring to FIG. 6, vibro-isolating members A are interposed between the bottom of engine VE and the top of frame B, so as to be disposed below engine VE. Referring to FIG. 7, parts of a bracket 5 fixedly attached onto the top of engine VE are mounted onto the tops of vibro-isolating members A disposed on the top of frame B, so that vibro-isolating members A are disposed above engine YE. Referring to FIG. 8, parts of brackets 6 fixedly attached onto the sides of engine VE are mounted onto the tops of vibro-isolating members A disposed on the top of frame B, so that vibro-isolating members A are disposed beside engine VE. The vibro-isolating supporting structure shown in FIG. 9 is the same type shown in FIG. 6, however, vibro-isolating members A of different vertical lengths are used.

Figure 10:
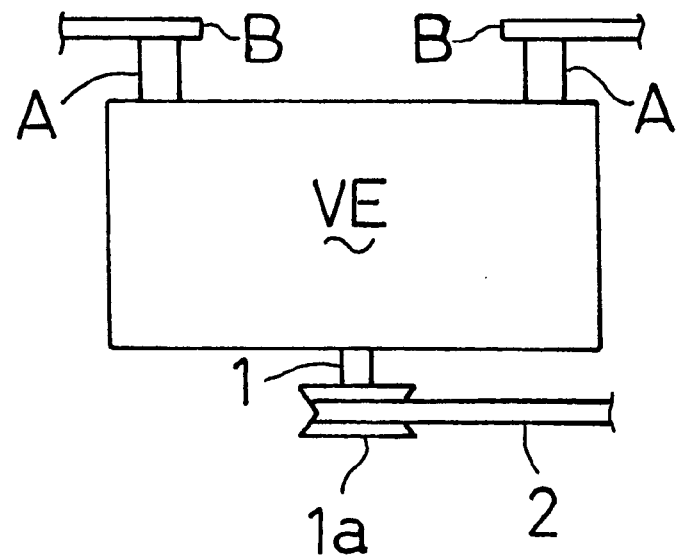
FIG. 10 is a side view of the same onto the bottom of frame B through vibro-isolating members A disposed above engine VE.
Figure 11:
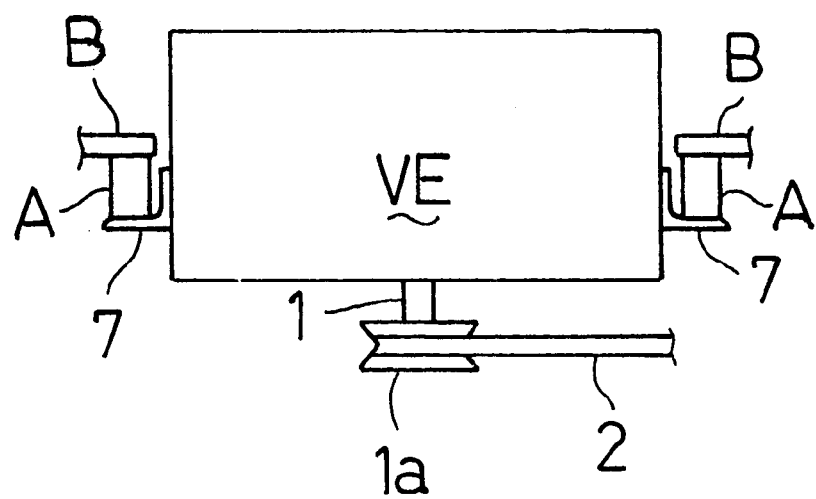
FIG. 11 is a side view of the same onto the bottom of frame B through vibro-isolating members A disposed beside engine VE.

The structure shown in FIG. 10 that vibro-isolating members A are disposed above engine VE is common with that shown in FIG. 7. The structure shown in FIG. 11 that vibro-isolating members A are disposed beside engine VE is common with that shown in FIG. 8. However, both the structures belong to a bottom-mounting type structure wherein engine VE or a bracket fixedly attached to engine VE is mounted onto the bottoms of vibro-isolating members A hung downwardly from frame B. Referring to FIG. 10, engine VE is mounted at the top thereof onto the bottoms of vibro-isolating members A hung downwardly from frame B. Referring to FIG. 11, brackets 7 fixedly attached to the sides of engine VE is mounted onto the bottoms of vibro-isolating members A hung downwardly from frame B.

Figure 12:
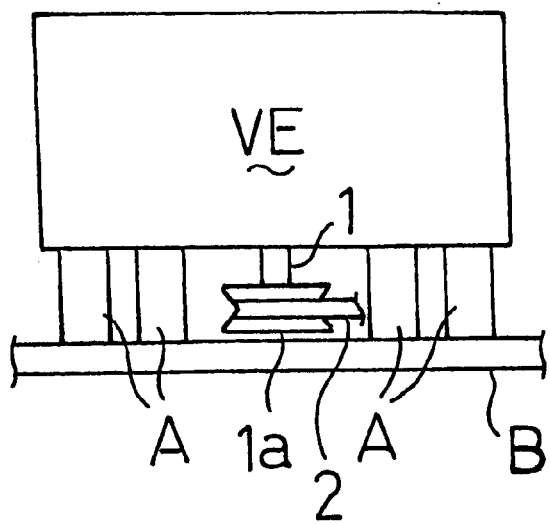
FIG. 12 is a side view of the same onto the top of frame B through vibro-isolating members A disposed below engine VE, wherein the number of vibro-isolating members A is increased.
Figure 13:
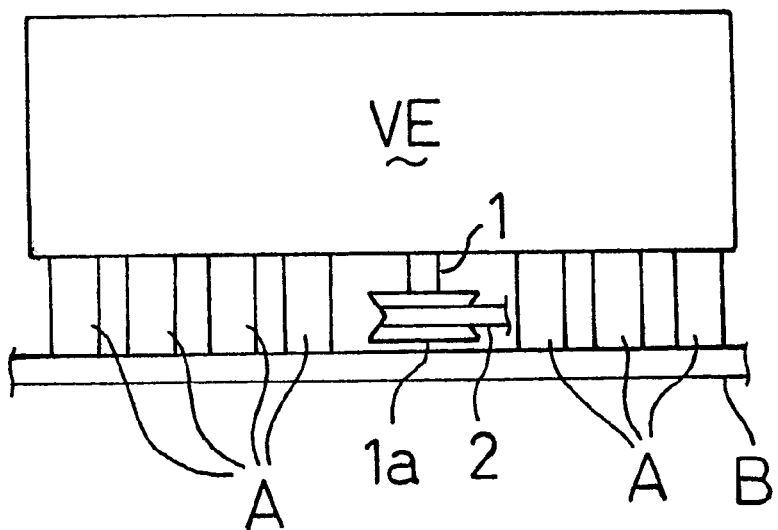
FIG. 13 is the same view, wherein the number of vibro-isolating members A is further increased.

The vibro-isolating supporting structures shown in FIGS. 12 and 13 belong to the top-mounting type including vibro-isolating members A disposed below engine VE similarly with that shown in FIG. 6, however, the number of vibro-isolating members A is increased.

Figure 14:
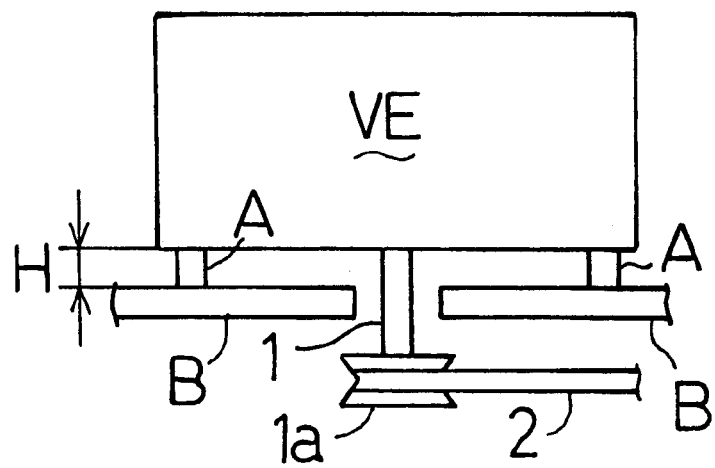
FIG. 14 is a side view of a vibro-isolating supporting structure of engine VE through vibro-isolating members A interposed between frame B and engine VE so as to make output shaft 1 project downwardly from frame B.

In all of the above-mentioned vibro-isolating engine supporting structures, especially referring to FIG. 6 (or either of FIGS. 9, 12 and 13), frame B is disposed below and engine VE is disposed above with respect to vibro-isolating members A. In this type engine supporting structure, output pulley 1a, which is required to be disposed lower than frame B below a main body of a vehicle like the lown tractor shown in FIG. 4, must be extended downwardly through frame B as shown in FIG. 14, whereby the problem arises that output shaft 1 must be lengthened so as to permit a vertical length H of vibro-isolating members A interposed between the top of frame B and the bottom of engine VE. The longer output shaft 1 causes the larger rotational moment thereof and the larger deflection thereof generated by the tension stress of belt 2, so that it is hoped to be as short as possible.

Figure 15:
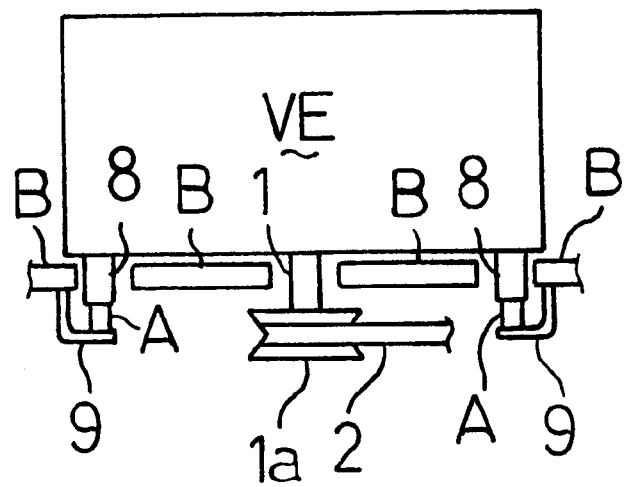
FIG. 15 is a side view of the same, wherein the space for interposing vibro-isolating members A between frame B and engine VE is reduced.

Corresponding to the situation that output shaft 1 is to be extended downwardly from frame B below engine VE, frame B, as shown in FIG. 15, is bored by a through-hole for allowing vibro-isolating member A to pass therethrough so as to reduce the gap between the top of frame B and the bottom of engine VE, so that output shaft 1 can be shortened by removal of vertical length H caused by vibro-isolating members A. In this regard, as shown in FIG. 15, a bracket 8 is interposed between the top of each vibro-isolating member A and the bottom of engine VE, or alternatively, the top of each vibro-isolating members A is directly joined to the bottom of engine YE. The bottom of vibro-isolating member A is mounted onto the top of a bracket 9 fixedly attached to frame B.

The important point for the above-mentioned various modifications about the vibro-isolating supporting structure of engine VE onto frame B is where vibro-isolating members A are disposed in their horizontal directions so as to correspond to the two horizontal forces of tension F1 caused by belt 2 and rotational torque F2. Explanation will next be given on various embodiments for arrangement of vibro-isolating members A.

Referring to FIGS. 18, 19, 22, 28, 35, 36, 37, 41, 43, 44, 45 and 47 used later for explanation about the arrangement of vibro-isolating members A, they are described as plan or bottom views in the above "Brief Description of the Drawings". In this regard, each of them designates a plan view when engine VE is disposed so as to direct its crankshaft (output shaft) upwardly from the top thereof, and it designates a bottom view when engine VE is disposed so as to direct the crankshaft (output shaft) downwardly from the bottom thereof as shown in FIG. 4. Also, in the case that each of later statements "viewed in plan" is applied for description of an embodiment including a downward crankshaft (output shaft), it is to be replaced with a statement "viewed in bottom".

Figure 16:
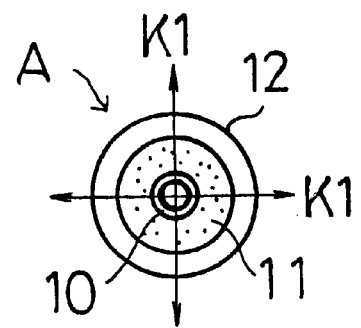
FIG. 16 is a side view of vibro-isolating member A.
Figure 17:
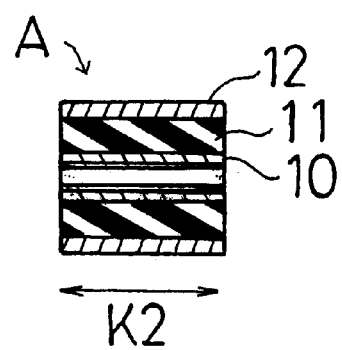
FIG. 17 is a sectional front or plan view of the same.

Referring to the construction of vibro-isolating member A, generally shown in FIGS. 16 and 17, elastic material 11 like rubber is provided around an axial core 10, which may form therein a female-screw so as to engage with a bolt. Due to such a construction, elastic material 11 of vibro-isolating member A has large flexibility (poor hardness) along axial core 10, so that a spring constant K2 (shown in FIG. 17) thereof in the direction of axial core 10 is small. On the contrary, elastic material 11 has small flexibility (great hardness) diametrically about axial core 10, so that a diametric spring constant K1 thereof (shown in FIG. 16) is larger than axial spring constant K2. In other words, elastic material 11 provides two directions of small and large spring constants perpendicular to each other appear.

Figure 18:
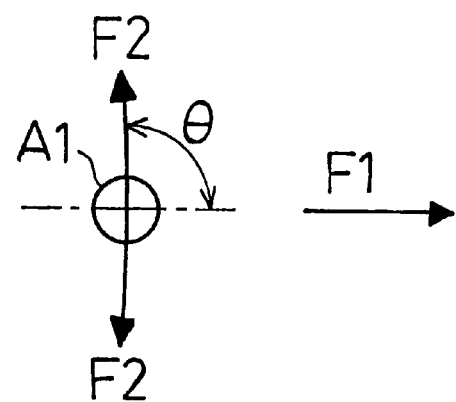
FIG. 18 is a plan or bottom view of a portion of engine VE where a vibro-isolating member A1 is disposed, showing the directions of tension F1 and rotational torque F2 caused by belt 2 applied thereonto, in the case that a center of gravity of the engine coincides with the output shaft (or the vibratory force direction coincides with that of rotational torque F2)

Accordingly, as shown in FIG. 18, for effective vibro-isolating supporting of engine VE, vibro-isolating members A should be disposed at positions, where tension F1 to be oriented in their directions of large spring constant K1 crosses rotary torque F2 to be oriented in their direct ions of small spring constant K2 substantially perpendicularly (an angle made by both forces F1 and F2 nearly equals 90 degree).

Figure 19:
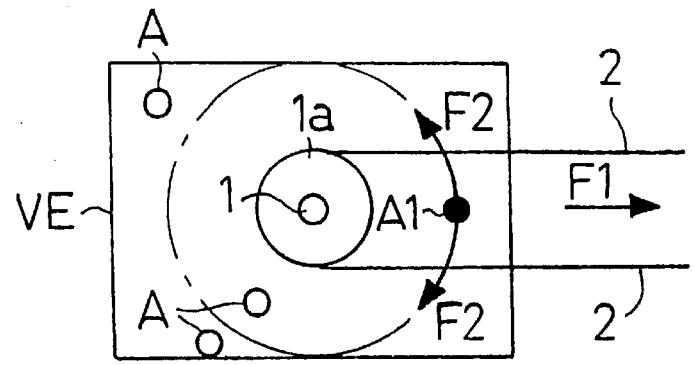
FIG. 19 is a plan or bottom view of engine VE showing an embodiment of the arrangement of vibro-isolating members A including vibro-isolating member A1 disposed on a position where tension F1 is substantially perpendicular to rotational torque F2.
Figure 20:
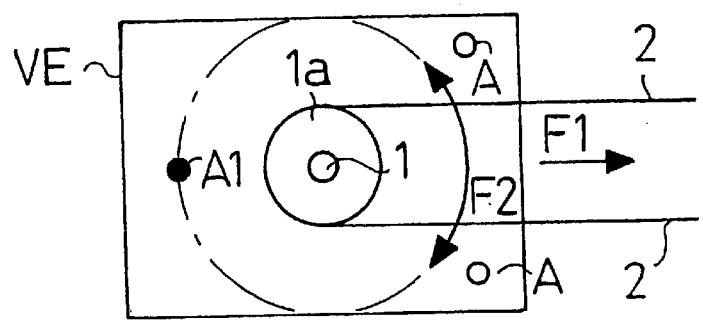
FIG. 20 is the same view showing another embodiment.
Figure 21:
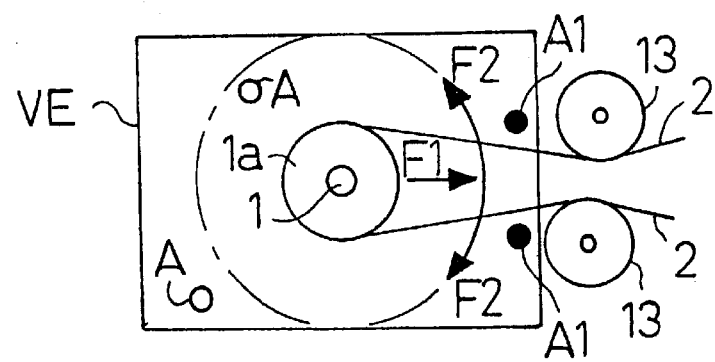
FIG. 21 is the same view showing another embodiment of the arrangement of vibro-isolating members A including vibro-isolating members A1 when the track directions of belt 2 are changed by tension pulleys 13.

FIGS. 19 through 27 show that at least one of vibro-isolating members A, which is designated as vibro-isolating member A1, is disposed at the position where tension F1 is perpendicular to rotary torque F2. Vibro-isolating member A1 is, as shown in FIG. 19, disposed between facing tracks of belt 2 wound around output pulley 1a. Alternatively, it is disposed in opposite to belt 2 about output pulley 1a as shown in FIG. 20. When directions of facing tracks of belt 2 are changed by tension pulleys (or idlers) 13 as shown in FIG. 21, vibro-isolating members A1 are disposed near tracks of belt 2 where both tension F1 and rotational torque F2 stressing output shaft 1 are perpendicular to each other.

Figure 22:
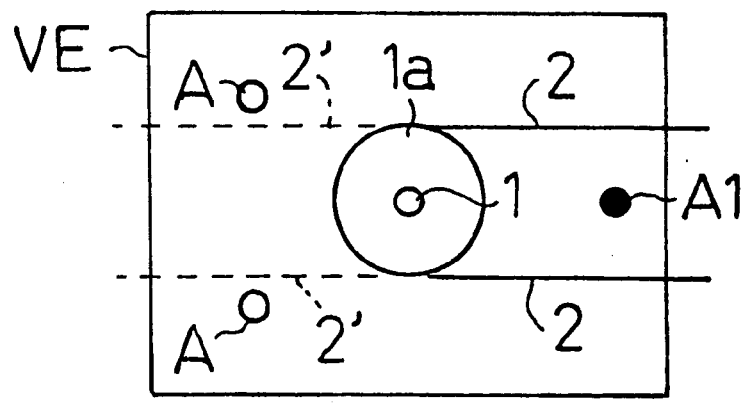
FIG. 22 is a plan or bottom view of engine VE showing an embodiment of the arrangement of vibro-isolating members A thereon, wherein vibro-isolating member A1 at the position where tension F1 and rotational torque F2 are substantially perpendicular to each other is disposed between facing tracks of belt 2.
Figure 23:
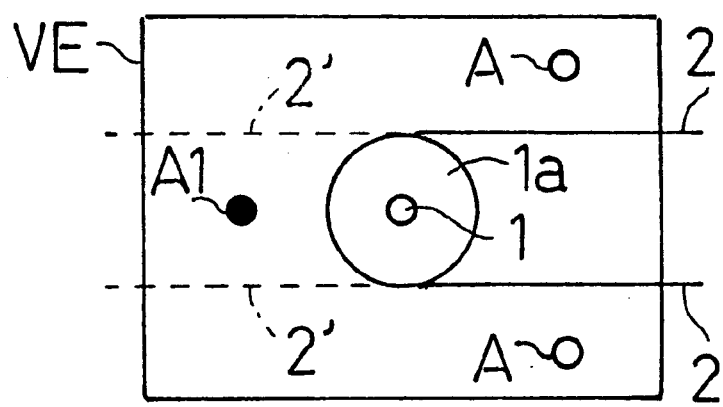
FIG. 23 is the same view showing another embodiment, wherein vibro-isolating member A1 is disposed between extensions 2' of facing tracks of belt 2.
Figure 24:
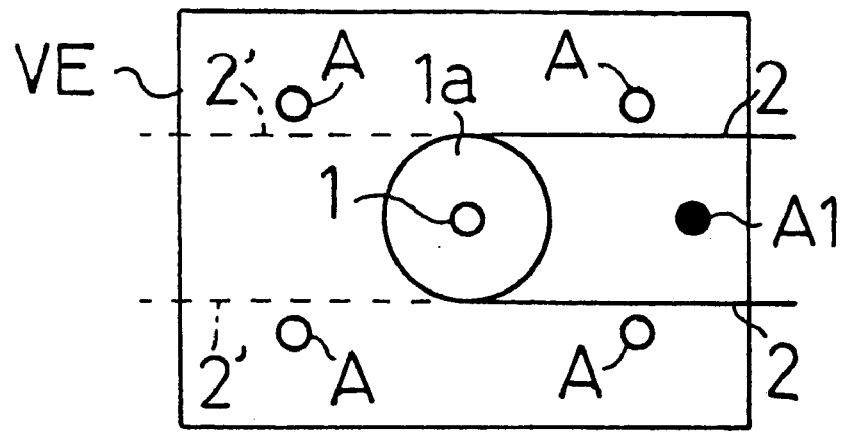
FIG. 24 is the same view showing further embodiment, wherein vibro-isolating member A1 is disposed between facing tracks of belt 2.
Figure 25:
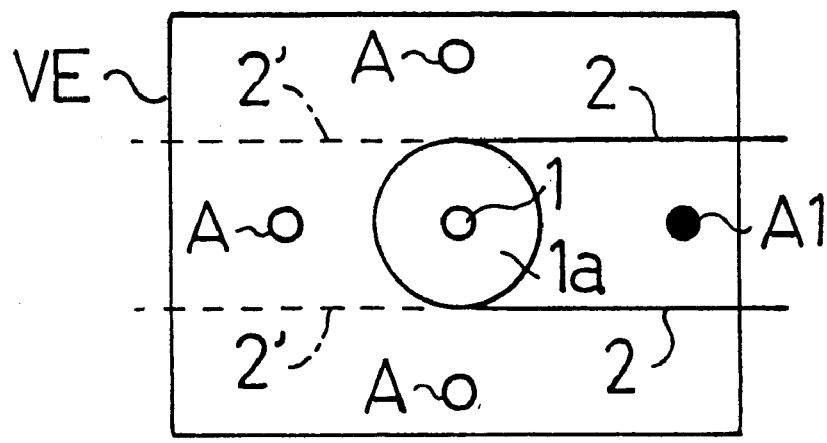
FIG. 25 is the same view showing further embodiment, wherein vibro-isolating member A1 is disposed between facing tracks of belt 2.
Figure 26:
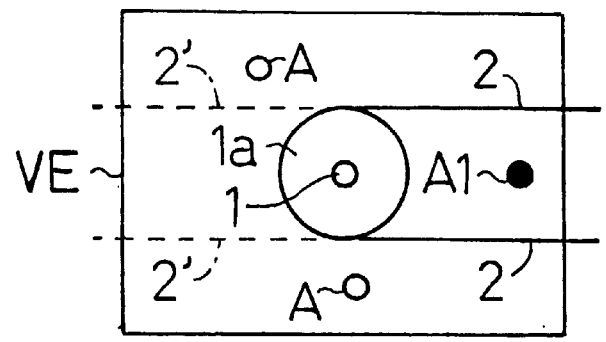
FIG. 26 is the same view showing further embodiment, wherein vibro-isolating member A1 is disposed between facing tracks of belt 2.
Figure 27:
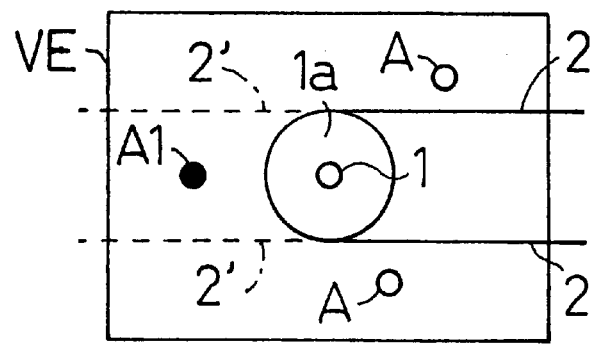
FIG. 27 is the same view showing further embodiment, wherein vibro-isolating member A1 is disposed between extensions 2' of facing tracks of belt 2.

As shown in FIG. 22, vibro-isolating member A1 may be disposed outside of the facing tracks (or extensions 2' thereof) of belt 2 between, however, the position between the facing tracks of belt 2 or extensions 2' thereof is preferable for the arrangement of vibro-isolating member A1 because there are more exactly perpendicular crossing of tension F1 and rotational torque F2. FIGS. 22 and 23 show two vibro-isolating members A except A1, FIG. 24 shows four, and FIG. 25 shows three, which are disposed symmetrically about a flat surface including output shaft 1 therein and parallel to tension F1 caused by belt 2. Two vibro-isolating members A except A1 shown in FIGS. 26 and 27 are disposed unsymmetrically about the same flat surface.

Referring to FIGS. 28 through 33, at least one vibro-isolating member A2 disposed on a flat surface S, which includes output shaft 1 therein and is parallel to tension F1, is shown. Flat surface S is directed diametrically of a circle viewed in plan centering output shaft 1, so that rotational torque F2 stresses flat surface S perpendicularly. Accordingly, vibro-isolating member A2 is stressed by substantially perpendicularly crossing tension F1 and rotational torque F2, thereby providing the effective vibro-isolating similar with vibro-isolating member A1. In this regard, tension F1 stresses horizontally on flat surface S, so that the large spring constant direction of vibro-isolating member A2 is disposed therealong. Rotational torque F2 stresses perpendicularly to flat surface S, so that the small spring constant direction thereof is disposed therealong.

Figure 28:
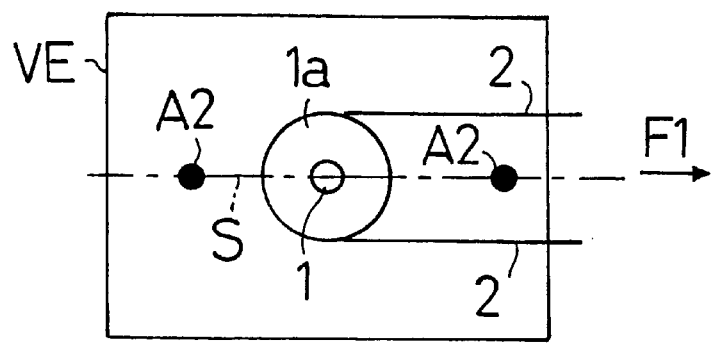
FIG. 28 is a plan or bottom view of engine VE showing an embodiment of the arrangement of vibro-isolating members A, wherein an vibro-isolating member A2 is disposed on a flat surface S which includes output shaft 1 therein and is parallel to tension F1.
Figure 29:
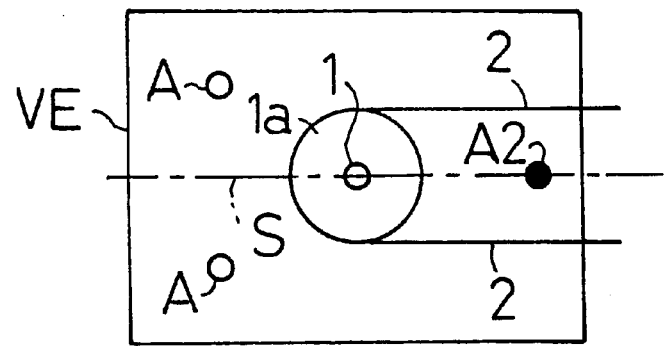
FIG. 29 is the same view showing further embodiment.
Figure 30:
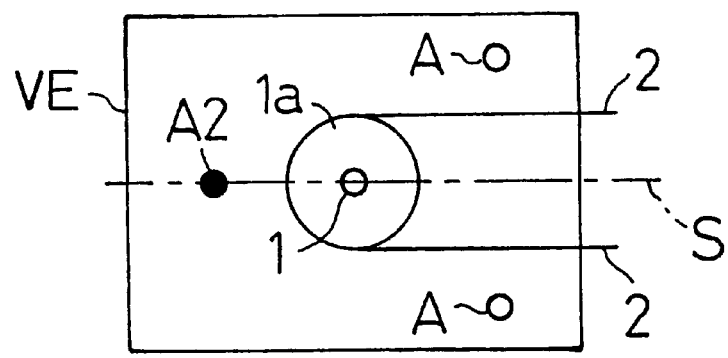
FIG. 30 is the same view showing further embodiment.
Figure 31:
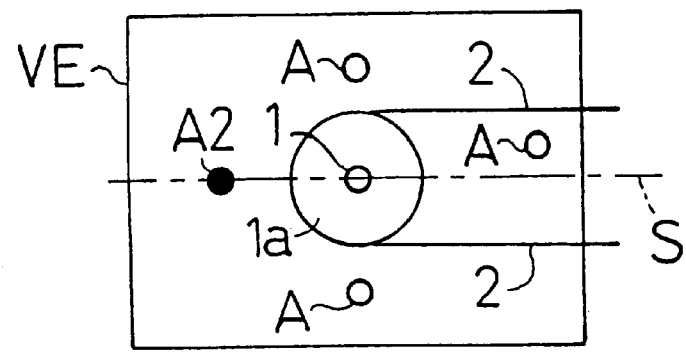
FIG. 31 is the same view showing further embodiment.
Figure 32:
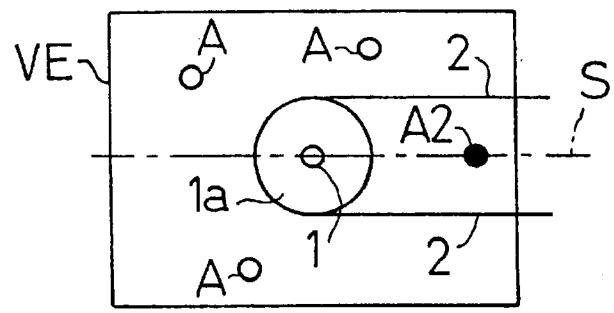
FIG. 32 is the same view showing further embodiment.
Figure 33:
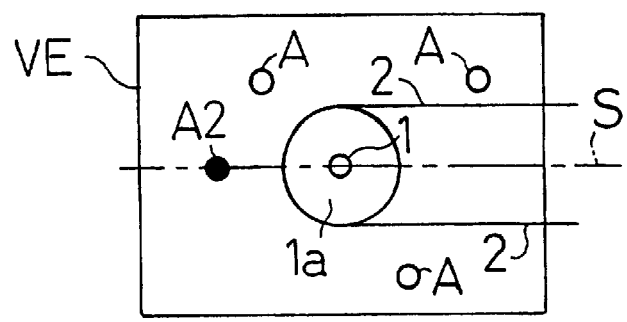
FIG. 33 is the same view showing further embodiment.

If only being on flat surface S, it is no matter whether vibro-isolating member A2 is disposed between the facing tracks of belt 2, as shown in FIGS. 29 and 32, or in opposite to belt 2 about output pulley 1a, as shown in FIGS. 30, 31 and 33. FIG. 28 shows that, with respect to belt 2, vibro-isolating members A2 are disposed both sections between the facing tracks thereof and in opposite thereto. Additionally, vibro-isolating members A except A2 may be disposed either symmetrically as shown in FIGS. 29 through 31 or unsymmetrically as shown in FIGS. 32 and 33 with respect to flat surface S. It should be noted that flat surface S, viewed in plan, looks like a straight line.

Figure 34:
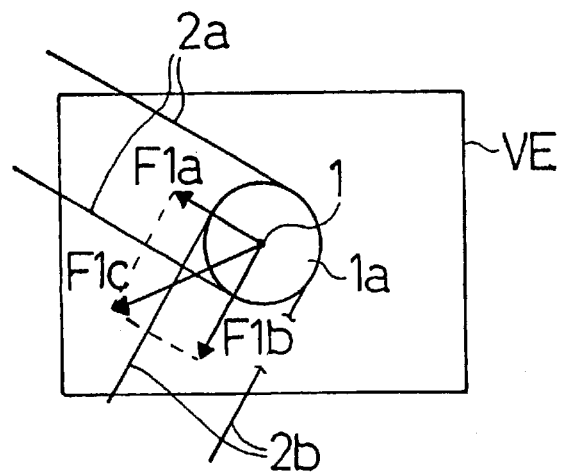
Figure 35:
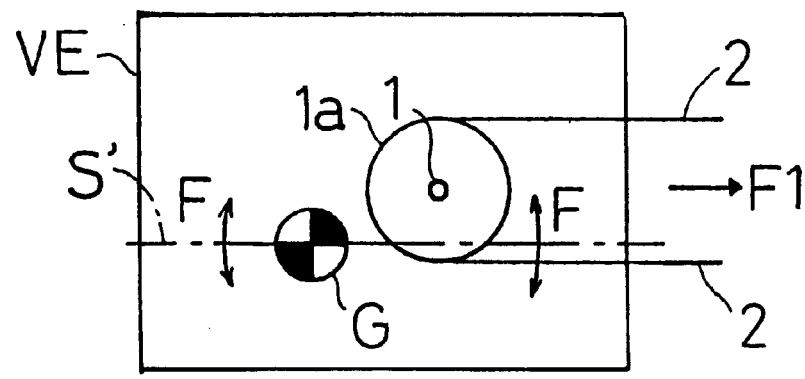
FIG. 35 is a plan or bottom view of engine VE having a center of gravity G which is a center of vibratory force F, wherein flat surface S is set to be parallel to output shaft 1 and tension F1.

The arrangements of vibro-isolating members A1 and A2 shown in FIGS. 19 through 33 are applied to the case that single belt 2 is wound around output pulley 1a. However, there may be provided a plurality of output pulleys 1a for a plenty of belts. FIG. 34 shows that belts 2a and 2b, whose track directions are different from each other, are wound around output pulleys 1a. In this case, it can be thought that vibro-isolating members A1 are disposed at both of positions where tension F1a of belt 2a and rotational torque F2 cross each other substantially perpendicularly and where tension F1b of belt 2b and rotational torque F2 cross each other substantially perpendicularly, or that vibro-isolating members A2 are disposed on both flat surfaces including output shaft 1 therein, one flat surface being parallel to tension F1a of belt 2a and the other being parallel to tension F1b of belt 2b. However, in the assumption that the individual tensions 2a and 2b are united to the resultant force F1c, it is preferable that vibro-isolating member A1 is disposed on a position where resultant force F1c and rotational torque F2 cross each other substantially perpendicularly, or vibro-isolating member A2 is disposed on a flat surface including output shaft 1 and parallel to resultant force F1c, thereby enabling the effective vibro-isolating supporting to be obtained with further few vibro-isolating members A1 or A2.

Next, explanation will be given on the arrangement of vibro-isolating members A applied to such an engine that its center of gravity, around which the vibratory force is generated, is offset from its output shaft.

The precondition for the above embodiments shown in FIGS. 18 through 34 is that vibratory force F coincides with rotational torque F2. However, the fact is that vibratory force F of engine VE, while it is caused by rotational torque F2 of the crankshaft (output shaft), does not necessarily coincide with rotational torque F2 centering the output shaft or crankshaft. Because engine VE is occasionally unequal in weight as a whole. In such a case, vibratory force F is generated about the center of gravity of engine VE. Therefore, in FIG. 35, there is designated a flat surface S' looking like a straight line when viewed in plan, which is parallel to both the axis of output shaft 1 and tension F1 of belt 2 and includes a center of gravity G therein. As shown therein, flat surface S' is vertically stressed by vibratory force F. FIGS. 36 through 40 show embodiments about the arrangement of vibro-isolating members A including such assumed flat surface S'.

Figure 36:
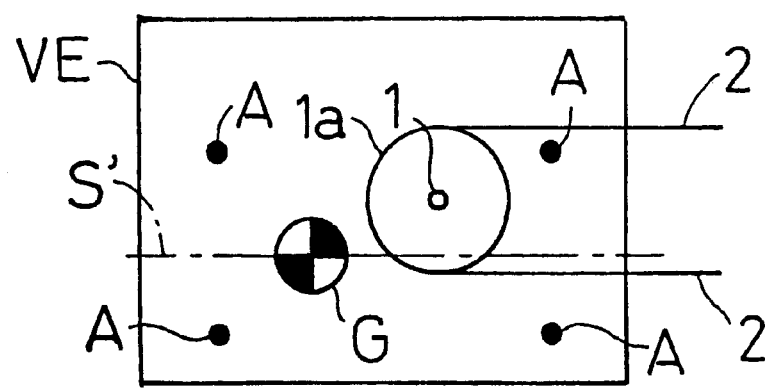
FIG. 36 is a plan or bottom view of engine VE showing that vibro-isolating members A are disposed thereon symmetrically about flat surface S.

Vibro-isolating members A shown in FIG. 36 are symmetrically disposed, so that the weights stressing respective vibro-isolating members A can be equalized.

Figure 37:
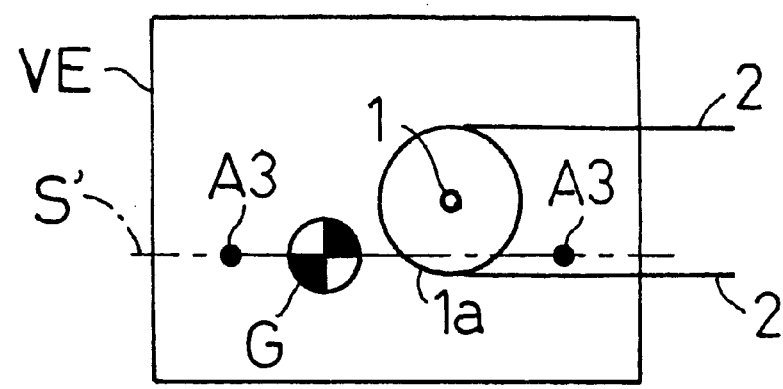
FIG. 37 is a plan or bottom view of engine VE showing that vibro-isolating members A3 are disposed on flat surface S.
Figure 38:
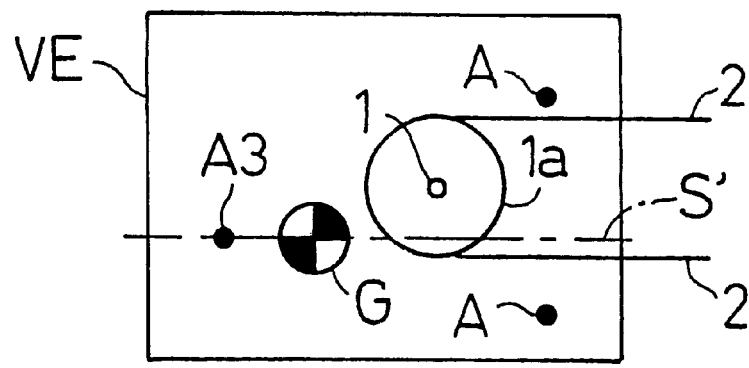
FIG. 38 is the same view showing another embodiment.
Figure 39:
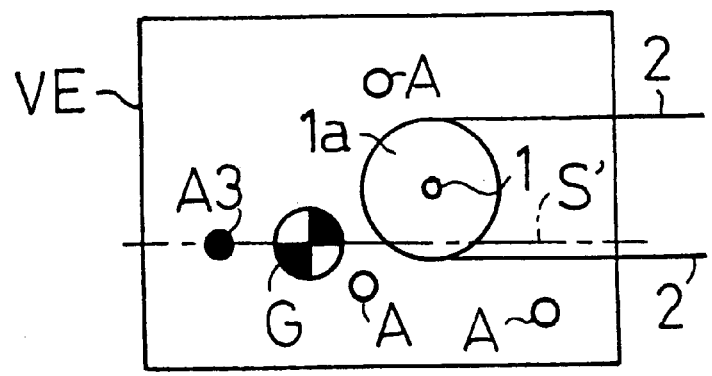
FIG. 39 is the same view showing further embodiment.
Figure 40:
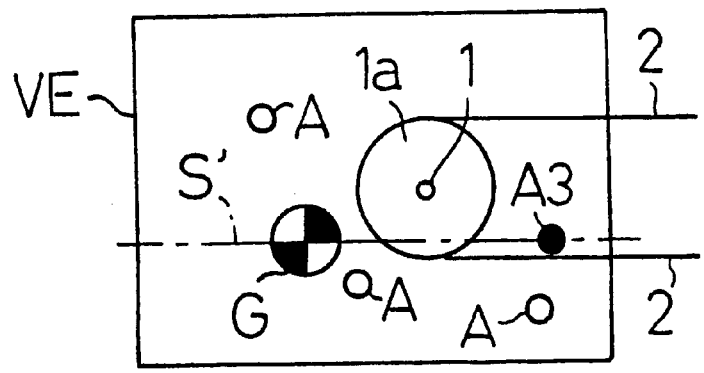
FIG. 40 is the same view showing further embodiment.

As shown in FIGS. 37 through 40, at least one vibro-isolating member A3 of vibro-isolating members A is disposed on flat surface S' so as to absorb tension F1 with its large spring constant K2 in its diametric direction and absorb vibratory force F of engine VE with its small spring constant K1 in the direction of its axial core 10. FIG. 37 shows that two vibro-isolating members A3 are disposed on flat surface S' symmetrically about center of gravity G. FIGS. 38 through 40 show that one vibro-isolating member A3 is disposed on flat surface S' and remaining vibro-isolating members A are disposed at both opposite sides of flat surface S'. It is noted that vibro-isolating members A at both opposite sides of flat surface S' are disposed unsymmetrically thereabout.

Vibro-isolating members A (A3) shown in FIGS. 36 through 40 are disposed in the situation that single belt 2 is wound around output pulley 1a. However, similarly to the former embodiments described according to FIG. 34, they may be disposed in the assumption of flat surface S' corresponding to the resultant force of tensions caused by a plurality of belts 2 so as to provide the effective vibro-isolating with few vibro-isolating members A(A3). For example, when two belts 2a and 2b are wound around output pulley 1a, flat surface S' is set in the assumption of resultant force F1c of tensions F1a and F1b caused by belt 2 replacing individual tensions F1a and F1b, and then, vibro-isolating members A are disposed symmetrically about flat surface S' or at least one vibro-isolating member A3 is disposed on flat surface S'.

Explanation will next be given on embodiments about the arrangement of vibro-isolating members A shown in FIGS. 41 through 44. For a precondition, rotational torque F2 causes the vibratory force. For the most preferred object, vibro-isolating member A, having a large spring constant along one direction and a small spring constant which is perpendicular thereto, should absorb the vibratory force directed with rotational torque F2. Therefore, vibro-isolating member A is disposed so as to make the direction of small spring constant K2 along its axial core 10 coincide with that of rotational force F2, and even at worst, it is not disposed at a position (like a position marked with ● shown in FIGS. 41) where the direction of rotational torque F2 coincides with that of tension F1 or parallel to F1.

Figure 41:
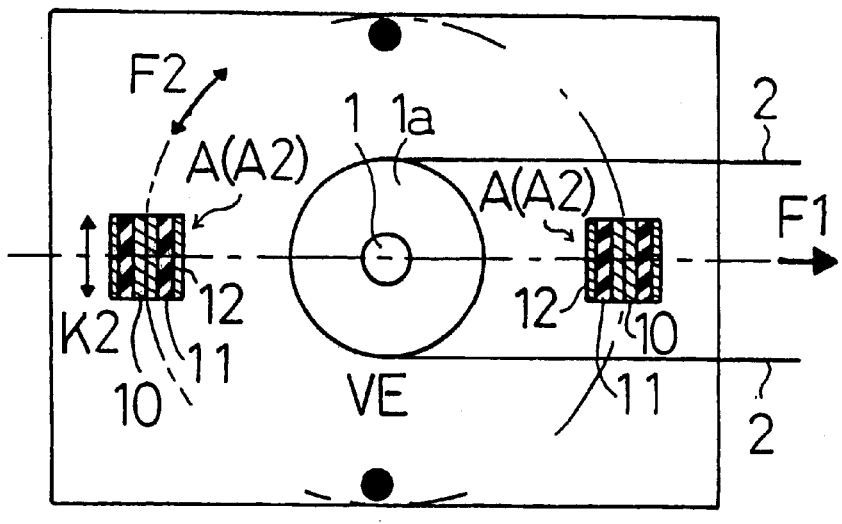
FIG. 41 is a plan or bottom view of engine VE showing the arrangement of vibro-isolating members A(A2) thereon viewed in section.
Figure 42:
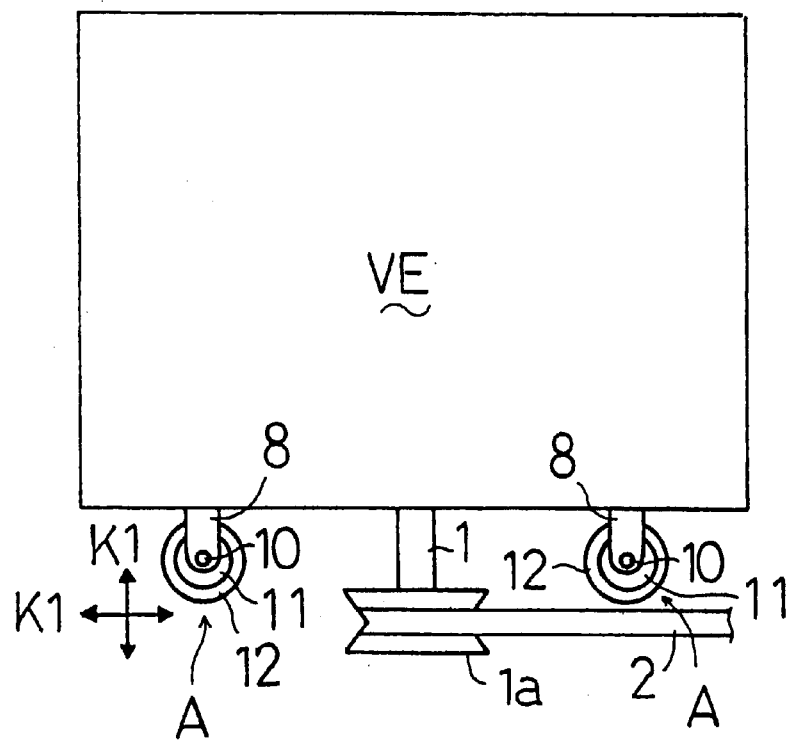
FIG. 42 is a side view of engine VE showing the arrangement of vibro-isolating members A(A2) thereon.
Figure 43:
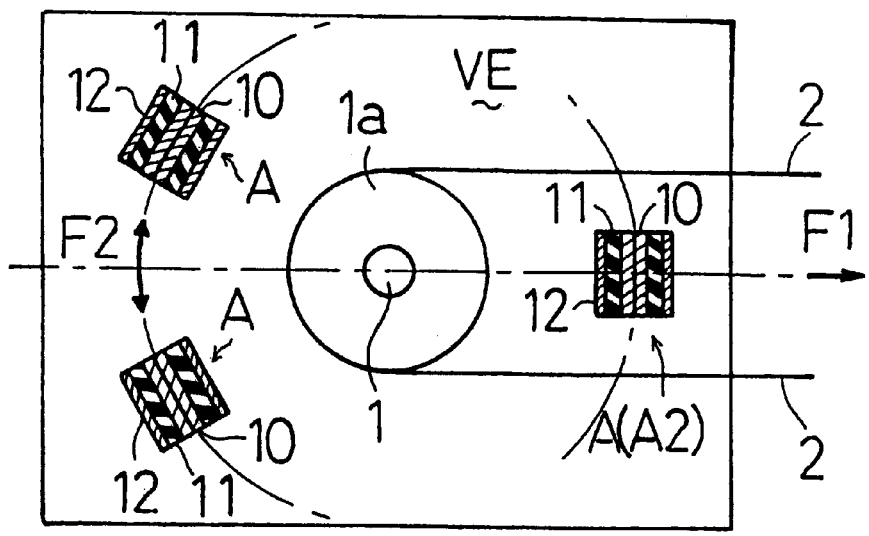
FIG. 43 is a plan or bottom view of engine VE showing the arrangement of three vibro-isolating members A(A2) thereon viewed in section.
Figure 44:
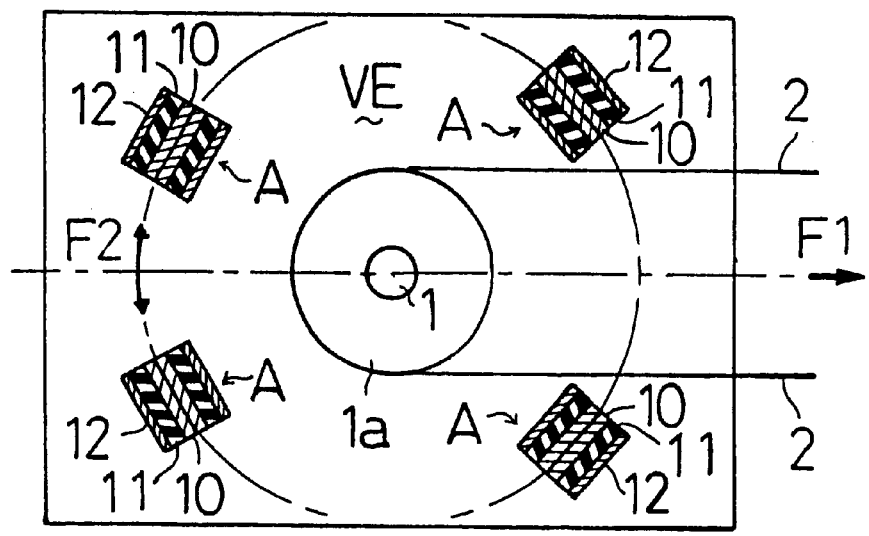
FIG. 44 is a plan or bottom view of engine VE showing the arrangement of four vibro-isolating members A(A2) thereon viewed in section.
Figure 45:
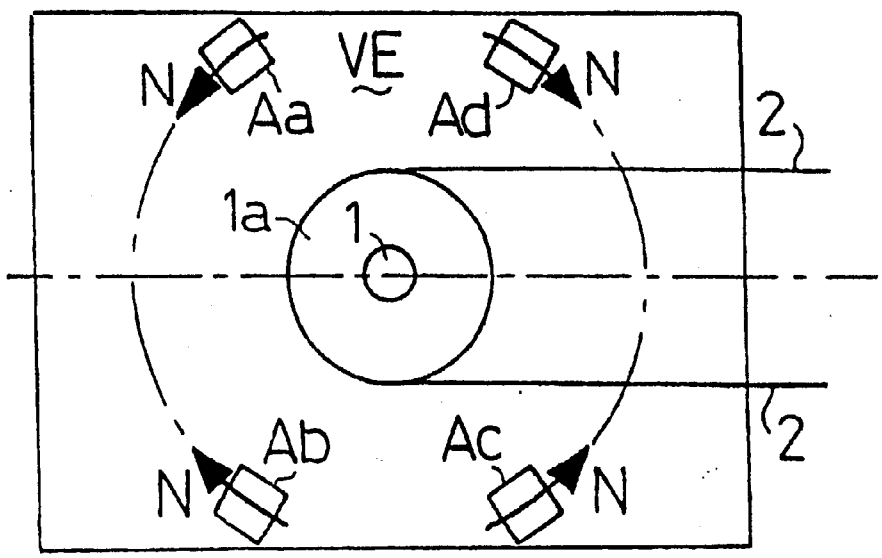
FIG. 45 is a plan or bottom view of engine VE showing the arrangement of vibro-isolating members A whose flexibilities are restricted in one way of their axial directions.

Vibro-isolating member A2 shown in FIGS. 41 and 43 is so disposed as to make its diametric direction perpendicular to its axial core 10 coincide with that of tension F1, similarly with vibro-isolating members A2 on flat surface S shown in FIGS. 28 through 33, so that the vibratory force caused by rotational torque F2 is absorbed and especially its resistance against tension F1 is set high, thereby preventing engine VE from distortion caused by stretch of belt 2.

When vibro-isolating member A is disposed at the position where the direction of tension F1 is different from that of rotational torque F2, so as to make the direction of its axial core 10 coincide with rotational torque (vibratory force) F2, elastic material 11 has large flexibility in the direction of axial core 10 with small spring constant K2. However, on the start of driving, the vibratory force is considerably strong, so that the deflection of elastic material 11 along axial core 10 thereof is increased, at worst, so as to exceed its limitation.

Figure 46:
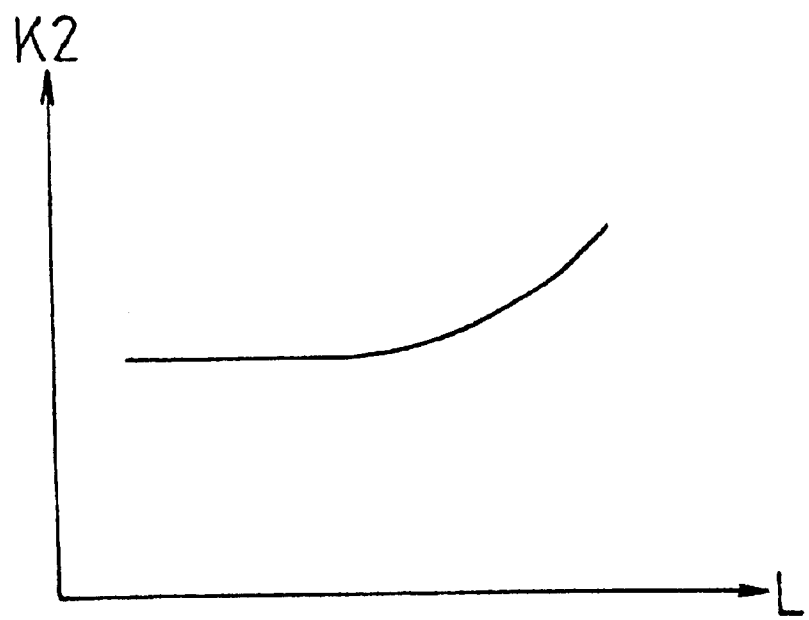
FIG. 46 is a graph illustrating a variation of the spring constant of vibro-isolating member A in relation to the deflection thereof in the direction along an arrow N shown in FIG. 45.
Figure 47:
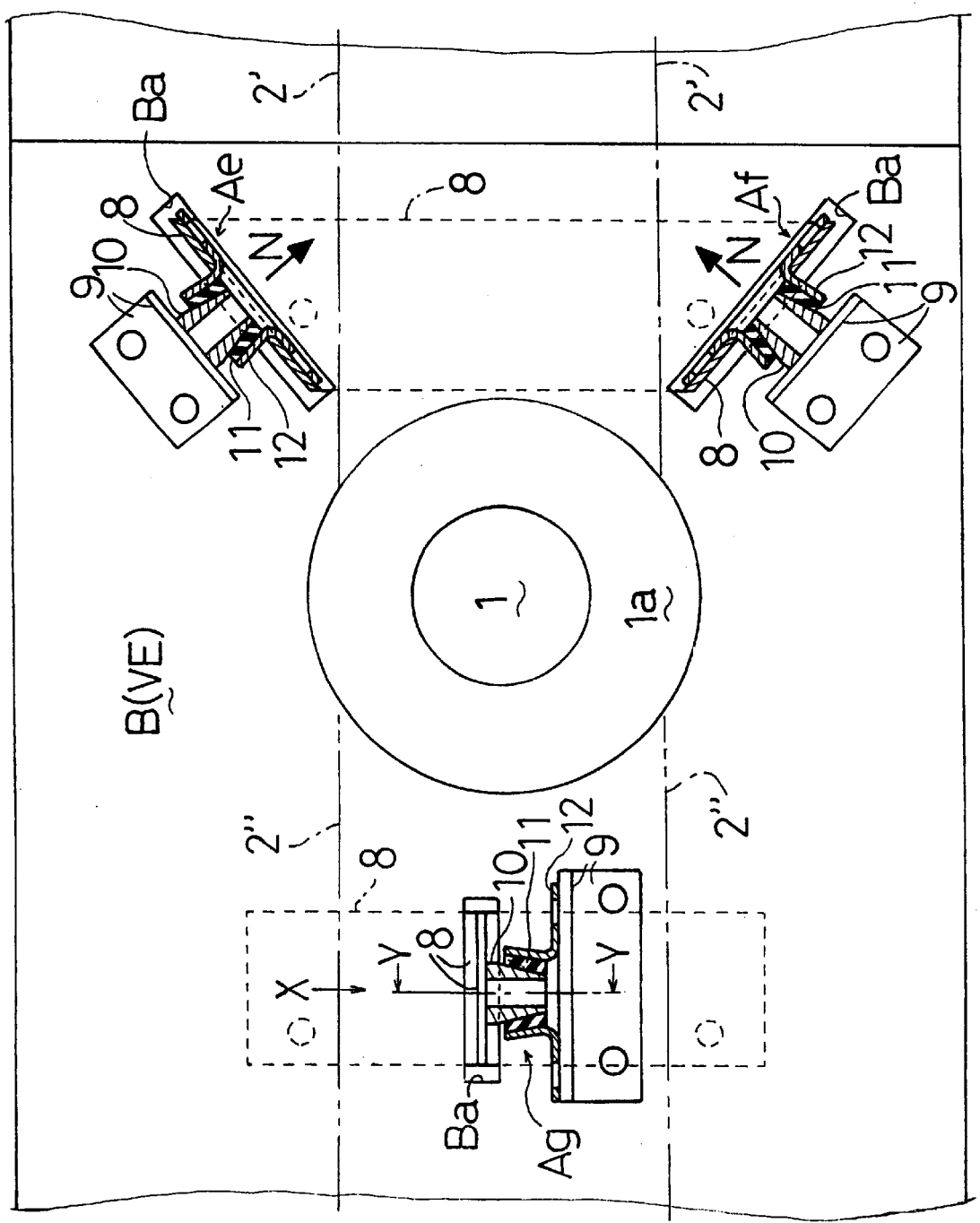
FIG. 47 is a plan or bottom view of engine VE showing the detailed structure and arrangement of vibro-isolating members A whose flexibilities are restricted in one way of their axial directions.
Figure 48:
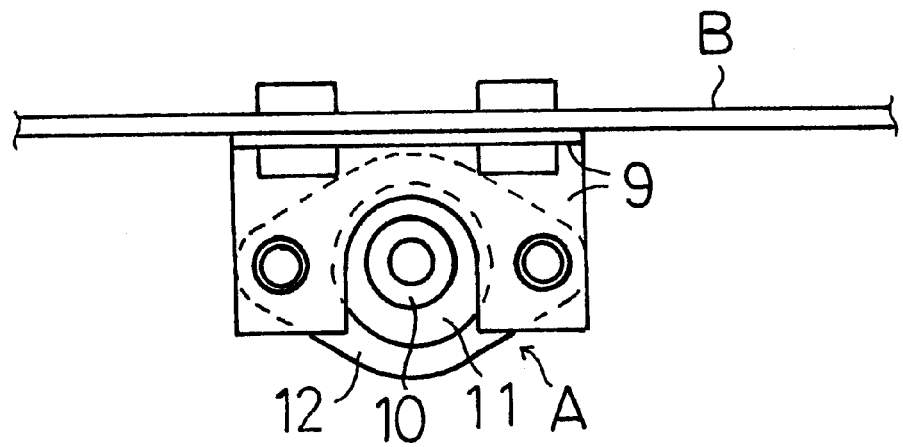
FIG. 48 is a view along an arrow X shown in FIG. 47 showing the same.
Figure 49:
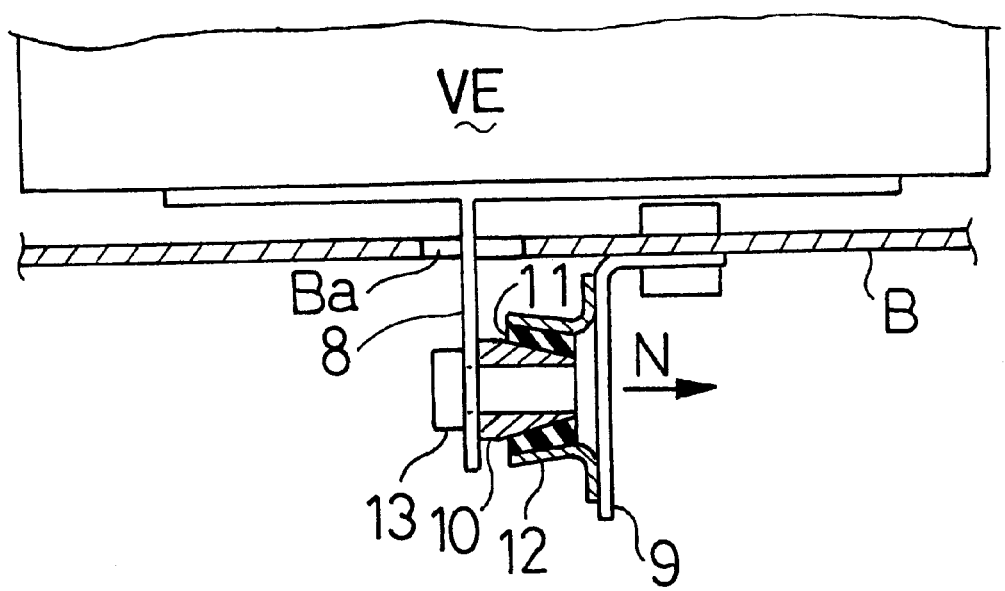
FIG. 49 is a view in section along the line Y—Y shown in FIG. 47 showing the same.

For restricting the deflection thereof, elastic material 11 is so constructed that, in one way of the both opposite directions along axial core 10, spring constant K2 is increased when deflection L exceeds a certain value as shown in FIG. 46. (It cannot have such characteristics in both opposite directions due to its taper formation as shown in FIGS. 47 through 49 discussed below.) With respect to each vibro-isolating member A shown in FIG. 45. an arrow N designates its characteristic direction as the above. Vibro-isolating members Aa and Ab are disposed so as to make their characteristic directions of arrows N face each other, vibro-isolating members Ac and Ad are similar. Due to such arrangement thereof, in the both opposite directions along rotational torque F2 appears the characteristics that spring constant K2 becomes large when deflection L exceeds a certain value as shown in FIG. 46.

The vibro-isolating supporting structure proof against the strong vibratory force on the start of driving as the above will be detailed according to FIGS. 47 through 49. At first, vibro-isolating member A, for its own construction, employs taper-like axial core 10 so as to make it appear that spring constant K2 is increased when deflection L is large in only one way of the both opposite axial directions. Outer cylinder 12 is also formed into a taper so as to fit axial core 10. Elastic material 11 is interposed between axial core 10 and outer cylinder 12. Due to such the construction, elastic material 11, while the deflection permission thereof being great (the spring constant being small) in the direction toward the large diametric side of axial core 10, appears so that spring constant K2 is increased in proportion to the deflection in the direction toward the small diametric side of axial core 10, thereby restricting the deflection permission in this way, which is to be directed along arrow N shown in FIG. 45.

The mounting structure of vibro-isolating member A to engine VE and frame B will be detailed according to FIGS. 48 and 49, wherein the above-described structure according to FIG. 15 is employed. In this regard, bracket 8 is fixedly attached to engine VE and is disposed so as to extend downwardly through a through-hole Ba provided in frame B. A bolt 13 is screwed into the female-screw or the like formed by axial core 10 of vibro-isolating member A so as to cramp vibro-isolating member A to the downwardly extending portion of bracket 8. One end portion of cylinder 12 of vibro-isolating member A is fixed to bracket 9 fixedly attached to engine VE.

Vibro-isolating member A like Ae, Af or Ag shown in FIG. 47 mounted as the above, for the arrangement viewed in plan thereof, is disposed so as to make the direction of its axial core 10 coincide with the direction stressed by rotational torque F2 around output pulley 1a. Vibro-isolating members Ae and Af are disposed so as to make their directions along arrows N, where the deflection of each elastic material 11 thereof is restricted, face each other. Hence, the deflections caused by the large vibratory force on the start of driving or the like are restricted in the both opposite directions along rotational torque F2.

Belt 2 is wound around output pulley 1a, even at worst, without making the direction of tension F1 perpendicular to axial core 10 of each vibro-isolating member Ae, Af or Ag. If belt 2 is wound along either dash and dotted lines 2' or 2" as shown in FIG. 47, vibro-isolating member Ag is applied as vibro-isolating member A2 shown in FIGS. 41 and 43 disposed at the position (flat surface S) where tension F1 and rotational torque F2 cross each other perpendicularly.

The above-mentioned vibro-isolating supporting structure for a vertical crankshaft type combustion engine has effects as follows:

At first, since the vertical crankshaft type engine provided with the power transmission endless winding means wound around its output shaft is vibro-isolating supported onto the support, such as a frame of a lown tractor, according to the first structure in "Disclosure of the Invention", the resonance of the frame, especially on the start of driving, is reduced in comparison with the conventional frame directly supporting an engine. The noise is also reduced. As a result, a driver can ride it for work comfortably. Moreover, the power transmission system between the vertical output shaft of the engine and a vertical driving shaft of a working machine, such as a mower of the lown tractor, which is equipped onto the bottom of the vehicle body, is constituted by the power transmission endless winding means like a belt or chain, so as to be simplified and make its maintenance easy.

If the vibro-isolating members were interposed between the engine and the support like a vehicle frame of a lown tractor, the output shaft of the engine would have to be lengthened so as to project downwardly from the frame, thereby increasing the deflection of the output shaft causing the amplitude of vibration to increase. However, according to the second structure of the present invention mentioned in "Disclosure of the Invention", the support is provided with a portion for allowing the vibro-isolating members to pass therethrough, so as to remove the space for interposing the vibro-isolating members between the frame and the engine, so that the output shaft projecting downwardly from the frame can be shortened by the removal, thereby restricting the amplitude.

Next, explanation will be given on the effects by the arrangement of the vibro-isolating members according to the present invention. The vibro-isolating member, due to its construction, has a small spring constant in its one direction and a large spring constant in another direction perpendicular thereto. Besides, the vertical crankshaft type engine is stressed by horizontal tension caused by the power transmission endless winding means and horizontal rotational torque caused by the crankshaft, so that there are some positions where the directions of the tension and the rotational torque exactly coincide with each other. It is preferable for restricting the distortion of the engine against the tension that the large spring constant direction is oriented along the tension, and for absorbing the vibratory force that the small spring constant direction is oriented along the rotational torque. Regarding to the position where the directions of tension and rotational torque coincide with each other, there are required spring constants running counter to each other in the direction, so that the problem would arise that the vibro-isolating member, when being disposed there, is reduced in its effective absorbing of either the tension or the rotational torque.

In terms of such the problem, according to the third structure mentioned in "Disclosure of the Invention", at least one of the vibro-isolating members is disposed at a position where the directions of tension and rotational torque cross each other substantially perpendicularly, so that it becomes possible that the large spring constant direction coincides with the tension direction while the small spring constant direction coincides with the rotational torque direction. In other words, the few vibro-isolating members, or only one, can absorb the both forces in different directions, thereby improving the effective vibro-isolating supporting of the engine. Moreover, according to the fourth structure in the same, the vibro-isolating member, which is disposed between the facing tracks of the power transmission endless winding means or between the extensions thereof, can be located at the better position where the tension and the rotational torque cross each other more exactly perpendicularly, thereby improving the vibro-isolating supporting of the engine and reducing the distortion thereof so as to restrict the slipping or waving of the belt or chain serving as the power transmission endless winding means.

Alternatively, a flat surface, which includes the output shaft therein and is parallel to the tension, is horizontally stressed by the tension therealong, and by the rotational torque in perpendicular thereto. Therefore, according to the fifth structure in the same, at least one of the vibro-isolating members is disposed at such the position, so that its large spring constant direction coincides with the tension direction and its small spring constant direction coincides with the rotational torque direction. As a result, the both forces can be effectively absorbed through such few (or one) vibro-isolating members. The distortion of the engine caused by pulling of the power transmission endless winding means can also be restricted so as to restrict the slipping or waving of a belt or chain serving as the power transmission endless winding means.

Furthermore, according to the sixth structure in the same, when a plurality of the power transmission endless winding means are wound around the output shaft, the tensions caused by the plural means can be united to the resultant force thereof, so that, it is only required for effectively vibro-isolating the engine and restricting its distortion that at least one of the vibro-isolating members is disposed at a position, where the both directions of the resultant tension and the rotational torque cross each other substantially perpendicularly, or on a flat surface, which includes the output shaft therein and is parallel to the resultant tension direction, without disposing a plurality of vibro-isolating members so as to correspond to the individual tension directions of the plural power transmission endless winding means.

There are some engines which are unequal in their weights so that their output shafts (or crankshafts) are offset from their centers of gravity. However, according to the seventh structure in the same, the vibro-isolating members are disposed symmetrically about a flat surface, which is parallel to the direction of the tension caused by the belt or chain serving as the power transmission endless winding means and includes the center of gravity of the engine therein, so that, at worst, the partial weights of the engine individually stressing the vibro-isolating members are equalized with one another.

Furthermore, according to the eighth structure in the same, one of the vibro-isolating members is disposed on a flat surface which is parallel to the tension direction and the output shaft and includes the center of gravity therein so as to be stressed by the substantially perpendicularly crossing tension of the power transmission endless winding means and vibratory force of the engine, and to make its large spring constant direction coincide with the tension direction and its small spring constant direction coincide with the vibratory force direction. As a result, the effective vibro-isolating can be obtained with such the few vibro-isolating members. Also, the distortion of the engine caused by the tension of the power transmission endless winding means can be restricted so as to improve the endurance of the power transmission endless winding means like a belt.

Moreover, according to the ninth structure in the same, when a plurality of the power transmission endless winding means are wound around the output shaft, the tensions caused by the plural means can be united to the resultant force thereof, so that, it is only required for effectively vibro-isolating the engine and restricting its distortion about the engine that the plurality of vibro-isolating members are disposed symmetrically about a flat surface, which is parallel to the output shaft and includes the center of gravity of the engine therein, or at least one vibro-isolating member is disposed on such the flat surface, so that the above-mentioned effect according to the seventh and eighth structures can be obtained and the number of the vibro-isolating members can be saved.

According to the tenth structure in the same, the vibro-isolating member is disposed at the position where the small spring constant direction coincides with the vibratory force direction, thereby absorbing the vibratory force of the engine. At the position, there is also the tension direction, which is different from the vibratory force direction, which is made to coincide with the small spring constant direction, thereby restricting the distortion of the engine caused by the tension of the power transmission endless winding means. Thus, only one vibro-isolating member can correspond to the both forces so as to provide the effective vibro-isolating.

Besides, on the start of engine-driving, large vibratory force is generated, which greatly increases the deflection in the axial direction of the vibro-isolating member with the small spring constant, so that the deflection may exceed its limitation so as to damage the vibro-isolating member or to reduce the endurance thereof. However, according to the eleventh structure in the same, the vibro-isolating member has such a characteristics that the spring constant in one way of the both opposite directions coinciding with the vibratory force direction is increased as the deflection thereof in the same direction is increased, whereby the deflection in the characteristic direction, when such a large vibratory force is generated, is restricted. Additionally, a pair of the vibro-isolating members are disposed so as to make the characteristic one way directions thereof face each other, so that the deflections thereof can be restricted in the both opposite directions thereof, thereby improving the vibro-isolating of the engine on its start and improving the endurance of the vibro-isolating members.

What is claimed is:

1. A vibro-isolating supporting structure for a vertical crankshaft internal combustion engine, comprising:
    a vertical crankshaft internal combustion engine;
    an output shaft of said engine;
    power transmission endless winding means wound around said output shaft;
    an engine support; and
    a plurality of vibro-isolating members interposed between said engine and said engine support for vibro-isolating supporting said engine onto said engine support, wherein at least one of said vibro-isolating members has a small spring constant in a direction thereof and is disposed at a position on said engine support such that the small spring constant direction of said at least one vibro-isolating member coincides with a vibratory force direction of said engine and wherein said small spring constant direction is different from a direction of tension caused by said power transmission endless winding means.

2. The vibro-isolating supporting structure for a vertical crankshaft internal combustion engine as set forth in claim 1, wherein said at least one vibro-isolating member has a characteristic that said spring constant thereof, in a one direction that coincides with said vibratory force direction, is increased as the deflection of said at least one vibro-isolating member in said one direction is increased, and at least a pair of said at least one vibro-isolating member are disposed at a position on said engine support so as to make each of said respective one directions thereof face each other.

3. The vibro-isolating supporting structure for a vertical crankshaft internal combustion engine as set forth in claim 1, wherein said at least one vibro-isolating member is disposed on said engine support at a position where said vibratory force direction of said engine, which coincides with said small spring constant direction of said at least one vibro-isolating member, is substantially perpendicular to said tension direction created by said power transmission endless winding means.

4. A vibro-isolating supporting structure for an internal combustion engine having a vertical crankshaft and a power transmission endless winding means wound around said crankshaft, comprising:

a plurality of vibro-isolating members interposed between the engine and an engine support for vibro-isolating supporting the engine onto said engine support, wherein at least one of said vibro-isolating members is located at a position on said engine support where a small spring constant direction of said at least one vibro-isolating member coincides with a vibratory force direction of the engine and where said small spring constant direction is different from a direction of tension created by the power transmission endless winding means.

5. The vibro-isolating supporting structure for an internal combustion engine having a vertical crankshaft and a power transmission endless winding means wound around said crankshaft as set forth in claim 4, wherein said at least one vibro-isolating member is disposed on said engine support at a position where the vibratory force direction of the engine, which coincides with said small spring constant direction of said at least one vibro-isolating member, is substantially perpendicular to the direction of tension created by the power transmission endless winding means.

6. A vibro-isolating supporting structure for an internal combustion engine having a vertical crankshaft and a power transmission endless winding means wound around said crankshaft, comprising:

a plurality of vibro-isolating members interposed between the engine and an engine support for vibro-isolating supporting the engine onto said engine support, wherein at least one of said vibro-isolating members is located at a position on said engine support where a small spring constant direction of said at least one vibro-isolating member coincides with a tangential direction of a circle centering the core of said crankshaft and where said small spring constant direction is different from a direction of tension created by the power transmission endless winding means.

7. The vibro-isolating supporting structure for an internal combustion engine having a vertical crankshaft and a power transmission endless winding means wound around said crankshaft as set forth in claim 6, wherein said at least one vibro-isolating member is disposed on said engine support at a position where the small spring constant direction, which coincides with a tangential direction of a circle centering the core of said crankshaft, is substantially perpendicular to the direction of tension created by the power transmission endless winding means.

* * * * *